(12) United States Patent
Battersby

(10) Patent No.: US 7,154,574 B2
(45) Date of Patent: Dec. 26, 2006

(54) COLOR LIQUID CRYSTAL DISPLAY DEVICES

(75) Inventor: Stephen J. Battersby, Haywards Heath (GB)

(73) Assignee: Koninklijke Philips Electronics N. V., Eindhoven (NL)

( * ) Notice: Subject to any disclaimer, the term of this patent is extended or adjusted under 35 U.S.C. 154(b) by 722 days.

(21) Appl. No.: 10/186,707

(22) Filed: Jul. 1, 2002

(65) Prior Publication Data

US 2003/0011728 A1 Jan. 16, 2003

(30) Foreign Application Priority Data

Jul. 10, 2001 (GB) .................... 0116788.1

(51) Int. Cl.
*G02C 1/00* (2006.01)
*G02C 1/04* (2006.01)

(52) U.S. Cl. .................... 349/106; 349/77; 349/53
(58) Field of Classification Search ............ 349/95, 349/110, 152, 58, 175, 86, 77, 106, 156, 176, 349/113, 88, 53
See application file for complete search history.

(56) References Cited

U.S. PATENT DOCUMENTS

| 4,003,081 | A | | 1/1977 | Hilsum et al. .......... 358/64 |
|---|---|---|---|---|
| 5,130,829 | A | | 7/1992 | Shannon ............... 359/59 |
| 5,132,821 | A | | 7/1992 | Nicholas ............... 359/59 |
| 5,452,113 | A | * | 9/1995 | Ikeno ................. 349/77 |
| 6,172,723 | B1 | * | 1/2001 | Inoue et al. ........... 349/95 |
| 6,311,190 | B1 | * | 10/2001 | Bayer et al. .......... 707/104.1 |
| 6,331,881 | B1 | * | 12/2001 | Hatano et al. ......... 349/86 |
| 6,348,961 | B1 | * | 2/2002 | Iwamatsu et al. ...... 349/175 |
| 6,602,563 | B1 | * | 8/2003 | Kobayashi et al. ..... 428/1.3 |
| 6,690,443 | B1 | * | 2/2004 | Poliakine ............. 349/152 |

FOREIGN PATENT DOCUMENTS

| EP | 0108472 | | 5/1984 |
|---|---|---|---|
| EP | 0435676 | A2 | 7/1991 |
| WO | WO0021037 | | 4/2000 |

* cited by examiner

Primary Examiner—Thien M. Le

(57) ABSTRACT

A color liquid crystal display device has an array of display pixels (10) for modulating input light and an array of associated color filter elements (40) which comprise electro-optic filtering elements switchable electrically between a color filtering state in which a required color output is produced and a state in which they are substantially transparent to the input light. Such switching can be used beneficially, for example to reduce power consumption by sacrificing full color output and allowing the brightness level of a back light to be decreased in view of the increased optical efficiency of the pixels when the filter elements are in their transparent state, or to improve viewability in the case of a reflective display used in poor ambient lighting.

20 Claims, 3 Drawing Sheets

COLOR LIQUID CRYSTAL DISPLAY DEVICES

The present invention relates to a colour liquid crystal display device comprising an array of display pixels each of which is driveable to modulate a light input and has associated therewith a respective colour filter element for colouring the modulated light.

Passive and active matrix type colour liquid crystal (LC) matrix displays are well known. An example structure of a typical colour active matrix liquid crystal display device, using thin film transistors (TFTs) as switching elements for the individual pixels and operable in transmissive mode, is described in U.S. Pat. No. 5,132,821. In this structure, a row and column array of individual, optically transparent pixel electrodes is carried on one transparent substrate (e.g of glass) together with crossing sets of row and column address conductors with each pixel electrode being located adjacent the intersection between respective row and column address conductors and connected to the column address conductor via its associated TFT whose gate is connected to the row address conductor. A second substrate of transparent material is spaced from the one substrate and carries on its internal surface a continuous electrode common to all pixels, an array of red, green and blue colour filter elements aligned with the pixel electrode array with each filter element overlying a respective pixel electrode, and a black matrix extending between the individual colour filter elements and overlying the TFTs and address conductors. Liquid crystal material, e.g twisted nematic LC material, is disposed between the two substrates, each of which further carries on its internal surface immediately adjacent the LC material layer an orientation layer. On the outer surfaces of the substrates, light polarizing layers are provided. In operation, white light from a light source is directed onto one substrate and is modulated according to the transmission characteristics of the individual pixels, as determined by control voltage signals applied to the pixel electrodes via their respective TFTs, to produce a display output at the other side of the device with each individual pixel producing a colour output according on the colour of its respective colour filter element.

It is well known that the operation of such a display device is very inefficient in the optical sense. In producing a display output, approximately half the input white light is lost due to the input polarizer layer, and approximately two thirds of the remaining light is lost due to the filtering action of the red, green and blue colour filter elements. A further fraction of the input light is lost due to the presence of the black matrix material. Thus, in order to obtain a reasonable display output brightness, a high brightness output light source is required which, in the case particularly of portable display applications using batteries, is clearly disadvantageous as significant amounts of electrical power are consumed by such a light source.

Such poor optical efficiency is found also in reflective mode LC display devices, using either a front light or simply ambient light, in which the pixel electrodes are of a reflective material and input light passing through the substrate carrying the colour filter elements and a polarizing layer is modulated and reflected back through that substrate by the pixel electrodes to produce a display output. As well as active matrix type devices, simple passive matrix colour liquid crystal display devices, both transmissive and reflective, suffer similarly from optical inefficiency.

It is an object of the present invention to provide an improved colour liquid crystal display device. More particularly, it is an object of the present invention to provide a colour liquid crystal display device which offers the capability of alleviating certain problems in use of the device which can result due to such optical inefficiency.

According to the present invention, there is provided a colour liquid crystal display device of the kind described in the opening paragraph wherein the colour filter elements comprise electro-optic elements which are electrically switchable at least between a state providing colour filtering and a state in which they are substantially transparent to the input light. Thus, the colour filtering function of the filter elements can be selectively switched off if desired to allow the multi-colour (white) input light to pass therethrough substantially unfiltered when, depending on the type of operational mode being employed, the conservation of electrical power or obtaining improved reflectivity are considered to be more important than a full colour display. In the case, therefore, of the device operating in a transmissive mode using a backlight or a reflective mode using a front light for example, then switching the colour filter elements to their substantially transparent state leads to an increased light throughput and hence an output display of higher brightness, albeit without full colour information content and comprising a black and white image with greyscale. Accordingly, the brightness of the light from the light source can then be reduced to lower electrical power consumption by the light source, while still maintaining an adequately bright display output for viewing purposes, assuming, as is normally the case, the output brightness of the light source is proportional to the power consumed. This capability is particularly beneficial in portable, battery-powered, products such as lap top computers, PDAs, mobile telephones, electronic organizers, and the like where electrical power conservation may be warranted from time to time.

In the case of a reflective mode display device reliant on ambient lighting then the colour filter elements could be switched off to provide a display output having improved visibility in poor ambient lighting conditions when otherwise only a dull, visually indistinct, colour display would be provided.

It is envisaged that various different materials and structures could be employed for the electro-optic filter elements such that they are capable of being selectively switched electrically. The required switching is between at least a first state in which the filter elements are substantially, although perhaps not necessarily totally, transparent to at least most of the visible light spectrum of the input light and a second, filtering, state in which they allow only a selected visible colour wavelength range, e.g red, green or blue, to pass through. If intervening states are permitted by the material used then slight colouring of the output light may be possible.

In a preferred embodiment, a known guest-host type of material is utilized for the filter elements. This material comprises a liquid crystal material incorporating a dye with the dye molecules being held in the same orientation as the LC material and rotating with LC molecules in response to applied electric fields. As the light-absorbing properties of such material are orientation dependent, the dye can effectively be turned from coloured to colourless for light passing through the material in a given direction.

For a row and column matrix array display device, the colour filter elements may conveniently be provided as a series of linear colour filter strips each corresponding to a respective row or column of pixels, and comprising for example, a cell of guest-host material with appropriate (red, green or blue) colour dye, and extending over the length of the pixel row or column. The set of cells may be provided on the outer surface of one substrate of the liquid crystal display device by mounting, for example, a transparent plate having a series of parallel channels containing the guest host material against the outer surface of the LCD substrate with the surfaces of the plate and substrate carrying opposing transparent electrodes to which control voltages are applied for switching the material between colouring and transparent states. Such channels may be formed using techniques similar to those employed, for example, in making the channels for containing ionisable gas and carrying electrodes in plasma-addressed liquid crystal display devices (PALCs).

To reduce the spacing between the filter element and its associated pixel, and thus potential problems with parallax due to the thicknesses of the LCD substrate and the filter element cells, then the colour filter cells may be disposed internally of the LCD between the LCD substrate and the LC material layer. This could be achieved, for example, by forming the colour filter cells in the manner of a PDLC (Polymer Dispersal Liquid Crystal) device in which the guest-host LC material is contained in droplet form carried in a polymer matrix.

The colour filter cells may be switched collectively so that they all switch together, for example by using electrode structures common to all cells, or alternatively the three sets of different colour filter cells could be switched independently of one another by using separate control electrodes for each set to which respective control voltages are applied. By way of example of the operation of a transmissive display device in the former case and with the colour filter elements all in their off state, the brightest pixel required in a displayed image can be identified by analyzing the display data signals and, using this information, the LC pixel can be set to its fully transmissive state and the required grey level obtained by reducing the back light power. Other pixels then produce their required (lower) brightnesses by being operated to appropriately attenuate to the input light. For dark images particularly, the resultant power saving in reducing the backlight power can be significant.

When the three differently-coloured sets of colour filter elements are independently controllable, power saving is possible while still providing a limited colour output.

Embodiments of colour liquid crystal display devices in accordance with the present invention will now be described, by way of example, with reference to the accompanying drawings, in which.

It will be appreciated that the figures are schematic and have not been drawn to scale. Also, the same reference numbers are used throughout the figures to denote the same or similar parts.

Figure 1:
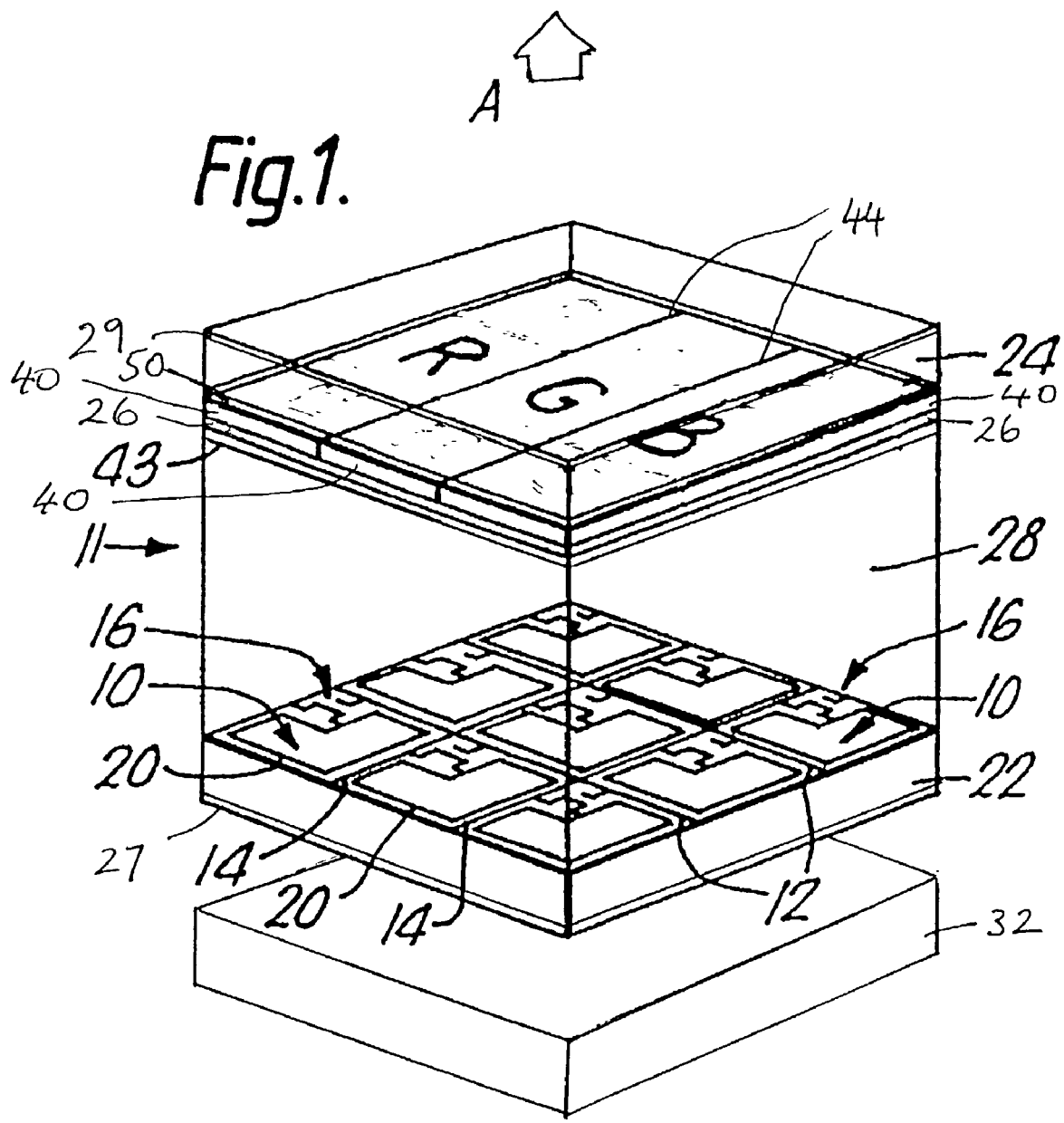
FIG. 1 is a schematic perspective sectional view through part of an embodiment of active matrix liquid crystal display device according to the present invention.

Referring to FIG. 1, the display device, which is suitable for producing full colour displays, comprises an active matrix LC display panel 11 operable in a transmissive mode and having a row and column array of individually-operable, generally rectangular, display pixels 10, only a few of which are present in the part of the panel shown.

Each display pixel 10 includes a respective thin film transistor, TFT, 16 that is located adjacent a respective intersection of sets of row and column address conductors 12 and 14 with the boundaries of the display pixels being determined by the spacings between adjacent pairs of the row and column conductors. For the sake of simplicity, the conductors 12 and 14 and the TFTs 16 are represented in FIG. 1 by plain lines and symbols respectively. The TFTs may comprise polycrystalline or amorphous silicon devices.

The gate electrodes of all TFTs 16 associated with display pixels in the same row are connected to a common row conductor 12 to which selection (gating) signals are supplied and the source electrodes associated with all display pixels in the same column are connected to a common column conductor 14 to which data (video information) signals are applied. The drain electrodes of the TFTs are connected to respective transparent pixel electrodes 20, for example of ITO, forming part of, and defining, their associated pixel display elements.

The row and column conductors 12 and 14, TFTs 16 and electrodes 20 are all carried on a transparent plate 22, for example of glass or a polymer material.

Parallel to, and spaced from, this plate is a further transparent plate 24, for example also of glass, on which is formed a continuous transparent conductive layer, for example of ITO, constituting a common electrode 26 for all the display elements of the device. Twisted nematic liquid crystal material 28 is disposed between the two plates 22 and 24, the two plates being sealed together around their periphery to contain this material.

Polarizing films 27 and 29 are provided over the outside surfaces of the substrates 22 and 24 in conventional manner.

The display panel 11 is illuminated by a white light source 32, for example a planar fluorescent or electroluminescent lamp, disposed to one side of the panel facing the plate 22 so that light, indicated by the arrow A, enters the device through this plate and exits through the plate 24 duly modulated according to the transmission characteristics of the display pixels 10. Alternatively, the light source 32 could be arranged to direct light onto the plate 24 with the display output then being obtained through the plate 22. The light source 32 produces white light, or at least has a spectral output characteristic which peaks in the red, green and blue wavelength regions, and is a variable power (dimmable) light source for reasons which will become apparent.

The operation of this kind of display device is generally well known and as such will not be described here in detail. Briefly, however, the liquid crystal material serves to modulate light through the device depending on a voltage applied thereacross with each display element, as defined by a pixel electrode 20 together with an opposing portion of the common electrode 26 and the intervening liquid crystal material, being individually operable to vary light transmission through the device in accordance with a drive voltage applied across its electrodes.

Row addressing of the array of picture elements is achieved by applying a gating signal to each row conductor 12 in turn which turns on all TFTs 16 in that row. Video data signals are applied to the column conductors 14 for each row of picture elements in turn in synchronization with the gating signals, these data signals being transferred to the appropriate row of display elements via the on TFTs of that row. By addressing all the rows of pixels in turn in a frame period a complete picture is built up.

The structure of the active matrix circuit carried on the substrate 22, and the manner of its fabrication, follow conventional practice, for example, as described in the aforementioned U.S. Pat. No. 5,132,821 and in U.S. Pat. No. 5,130,829, whose contents are incorporated herein, and as such will not be described here. The TFTs 16 may be fabricated in a number of different ways as will be apparent to persons skilled in the art.

Figure 2:
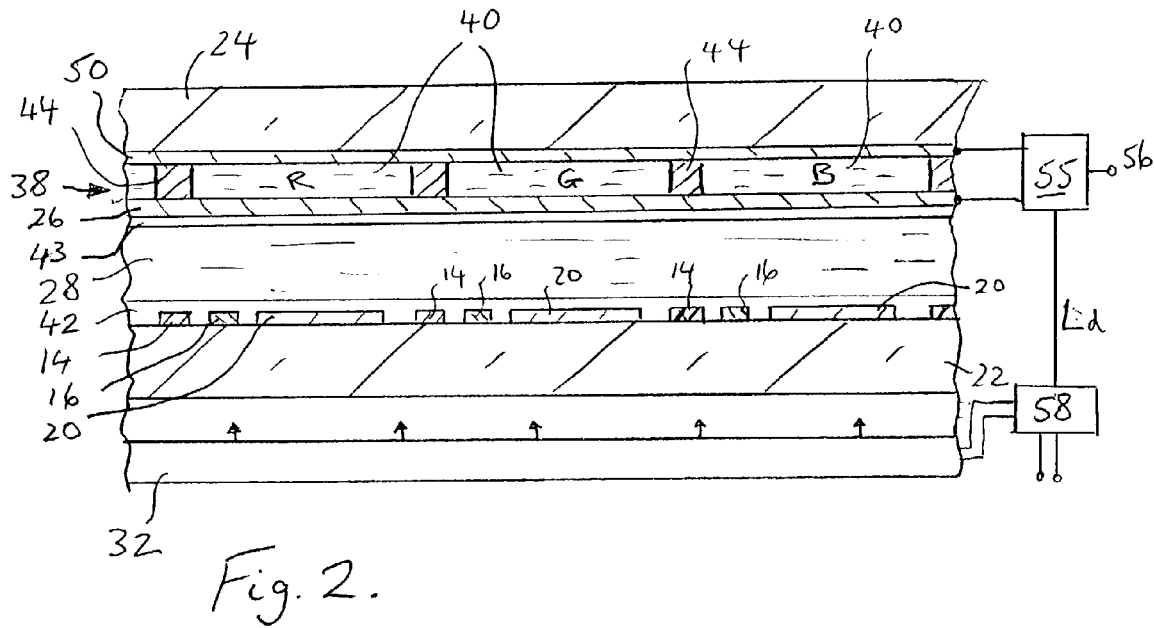
FIG. 2 is a schematic cross-section through part of the device of FIG. 1.

FIG. 2 shows schematically a cross section through a portion of the panel comprising a few typical display pixels. In this figure, the TFTs 16 are represented as blocks for simplicity. The structure on the substrate 22, comprising the pixel electrodes 20, TFTs 16, and row and column address conductors 12 and 14 are covered by a continuous LC alignment layer 42 as is conventional. Similarly, the substrate 24 carries on its inner surface immediately adjacent the LC layer 28 an LC alignment layer 43.

In addition to the layer 43 and the common electrode 26, the substrate 24 also carries a colour filter array 38 comprising sets of red (R), green (G), and blue (B) filter elements 40 in registration with the display pixels 10 for colouring the light outputs of the display pixels. The colour filter elements 40 in this embodiment are organized as a series of parallel strips extending in the column direction, with each strip being aligned with, and overlying, a respective column of display pixels, and are arranged in a repeating pattern of groups of three, each group having a red, green and blue element constituting a colour triplet.

The colour filter elements 40 comprise electro-optic material which is switchable electrically between at least a first state in which the elements perform the required colouring function in which their respective associated column of display pixels provide a colour light output, either red, green or blue, when displaying full colour images, and a second state in which the filter elements are substantially transparent to the input light and provide no colour filtering function so that the display pixels serve only to modulate the input, i.e. white, light. Thus, unlike conventionally used colour filter elements, the filter elements here are active rather than passive.

The colour filter elements 40 in this embodiment comprise a guest-host LC material preferably contained in a transparent polymer matrix in the manner of PDLC (polymer dispersed liquid crystal) materials and are arranged as a set of linear cells in a planar array overlying respective columns of display pixel electrodes 20 with each cell being defined and separated from its adjacent cells by light absorbing material 44, for example black dyed polyimide, extending as linear strips forming cell walls separating adjacent columns of display pixels and lying over the column address conductors 14.

The common electrode 26 extends over the side of the planar array of colour filter cells facing the LC layer 28. The electrode 26 may be formed directly on the PDLC material and the cell walls or alternatively these parts may be covered by a glass microsheet and the electrode 26 provided on this instead. Over the opposing side of the cell array, between the cell array and the surface of the substrate 24, a further ITO electrode layer 50, is provided which extends parallel with the electrode 26 and, like that electrode, continuously over the area of the cell array.

The three groups of cells are selectively operable to transmit a respective primary colour (red, green or blue) and absorb the other two primary colours.

The guest-host materials in the colour filter cells 40 comprises LC material to which appropriate colour dyes are added. Such materials are known in the art. In this material, the dye molecules are held in the same orientation as the LC material and rotate together with the LC molecules with applied electric fields. Light passing through the cells is subjected to the light absorbing properties of the dye and since these are orientation dependent then the transmitted light can be switched from coloured, according to the particular dye, to colour-less (i.e substantially unfiltered, white, light) by appropriately controlling the applied field. This is achieved by means of the application of suitable voltages to the electrodes 26 and 50. The voltage on the electrode 26 is determined by the requirement of the display pixels in accordance with known TFT LCD drive schemes. The voltage supplied to the electrode 50 is thus switched by a voltage control circuit 55 relative to voltage of the electrode 26 in order to obtain the required response of switching the cells between their first, substantially transparent, and second, selective absorption colouring, state. In this simple example embodiment, the cells are controlled by unpatterned common, electrodes and so are all switched between the two states together.

In the normal operating mode, the control circuit 55 is set, via a control input 56, so as to apply a voltage across the electrodes 26 and 50 to cause the filter elements 40 to perform their colouring function by passing light of one colour and thereby provide at their output appropriate colour light from their associated pixel columns. When it is desired to operate the display in a power saving mode, a control signal is applied to the input 56 whereupon the control circuit switches the voltage applied to the electrode 50 so as to switch the elements 40 to their substantially transparent, non-colouring, state. At the same time, the control circuit 55 supplies a brightness control signal Ld to the light source energisation circuit 58 causing the energisation circuit 58 to switch the light source 32 to a lower brightness output level in which less electrical power is consumed. Accordingly, a non-coloured, black and white, display output comprising modulated, white, light from the light source is produced. Although the brightness level of the light source emission is reduced, the brightness of the display output is not correspondingly reduced as the filtering function of the filtering elements is disabled.

Similar operation can be employed in the case of the display device comprising a reflective display device and using a front light. In such a device, the pixel electrodes 20 are formed of bright reflective material and a light source is arranged instead facing the substrate 24.

In a reflective type display device relying solely on ambient light rather than having its own light source, the colour filter elements 40 may be switched to their substantially transparent state in order to improve visibility of display information in poor ambient lighting conditions. For this purpose, colour content in the display output is sacrificed but display output brightness is effectively enhanced through utilizing ambient light without filtering. Consequently, rather than a dull colour display output being produced, a more highly visible white light display is obtained.

The provision of the switchable colour filter element array 38 on the inner side of the substrate 24 is considered preferable to avoid possible problems with parallax. If the colour filter cells were to be provided instead outside the LC cell and the thickness of the substrate 24 and were large compared to the pitch of the pixels, then problems with parallax could result. However, such arrangements may be feasible in certain circumstances and FIGS. 3, 4 and 5 illustrate possible alternative structures which could then be employed.

Figure 3:
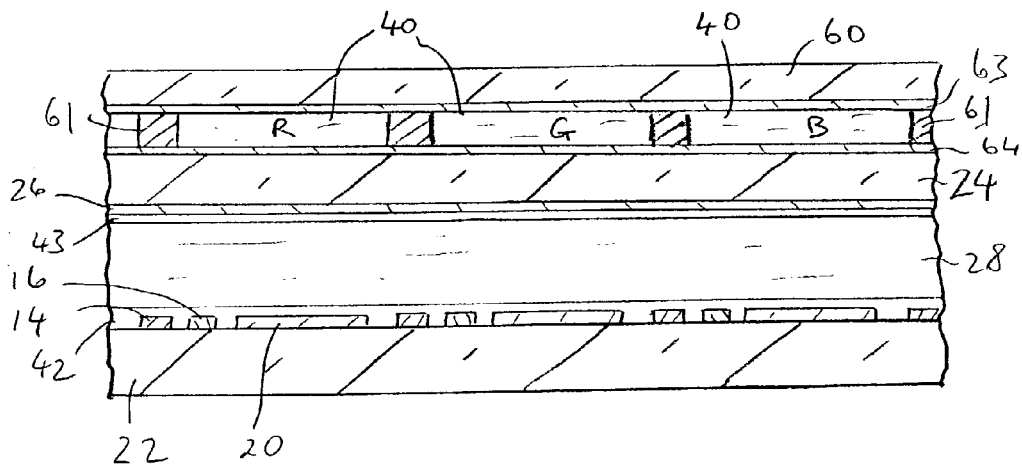
FIGS. 3, 4 and 5 are schematic cross-sectional views of further, modified, embodiments of liquid crystal display devices according to the present invention.

In the device of FIG. 3, the elements 40 of the switchable colour filter array 38 are formed by disposing a transparent, e.g. glass, substrate 60 over the substrate 24 and separated from the substrate 24 by parallel insulating spacer strips 61 positioned regularly over the substrate 24 in relation to the pixel electrodes 20 such that each cell defined between two adjacent spacer strips, and constituting a colour filter cell, overlies a respective column of display pixels 10. The facing surfaces of the substrates 24 and 60 carry respective, continuous, ITO electrodes 63 and 64 to which voltage can be applied for controlling the switching of the colour filter cells between their colouring and substantially transparent states, which here is achieved independently of the required voltage operation of the common electrode 26 of the LC cell. The switchable guest host LC material used for the cells need not in this case be provided in the form of PDLC material but can be contained in the cells instead. The spacer strips 61 preferably are of light opaque material so that they are act in the manner of a black matrix.

Figure 4:
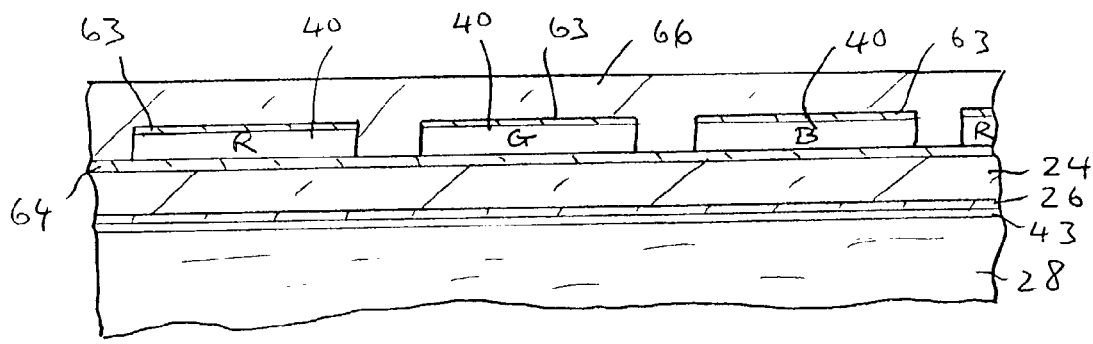

The embodiment of FIG. 4 is similar except that the substrate 60 and spacer strips 61 are here provided as a single piece component 66, for example as a glass plate having a set of linear, parallel, channels formed therein, each channel defining a respective colour filter element 40. The channels may be fabricated by various techniques such as those used to form channeled substrates for PALC (Plasma Addressed Liquid Crystal) display devices in which the channels serve to contain an ionisable gas. The energizing electrode 63 here is divided into individual portions each of which extends over the base of the respective channel. This sub-division of the electrode facilitates independent control of the different colour filter cells.

Figure 5:
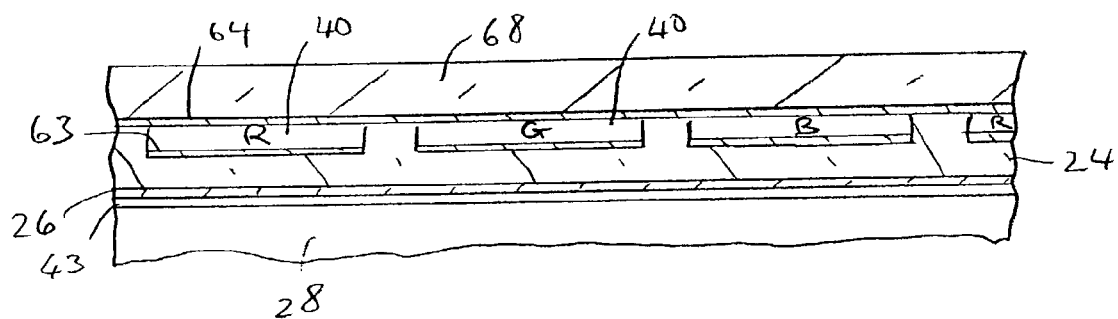

FIG. 5 illustrates a modification of the embodiment of FIG. 4 in which the channels are instead provided in the outer surface of the substrate 24. A simple, flat, glass plate 68 is provided over the substrate 24 to close the channels and carries the continuous electrode 64 on its inner surface.

In the embodiments of both FIGS. 4 and 5, the thickness of the substrate 24 can be reduced in order to lessen potential problems with parallax as its structural function is supplemented by the additional substrate 66, 68.

In the above-described embodiments, switching of the colour filter elements between their full colouring and substantially transparent states has been used. The filter elements 40 may, though, be switchable to an intermediate state or states (or continuously variable) by adjusting the voltage applied across the colour filter cell in which some colouring of the light output from a display pixel is still obtained, although less than the saturated colouring provided when the colour filter element is operating normally. In this partial colouring state, the light output level will be greater than that in the saturated colour mode, thereby enabling the light source brightness output to be reduced. A slight colouring of the display image achieved in this way could be helpful where some colour content in the image is desired.

Also in all the above-described embodiments the differently coloured filter elements 40 are switched collectively. However, this need not be the case and one of the transparent electrodes associated with the colour filter elements 40, for example, the electrode 50 in the FIG. 2 embodiment, may be subdivided into three separate parts with each part being respectively associated with the filter element cells of one colour so that the colour filter elements 40 of one colour can be controlled together but each set (R, G, B) of filter elements is controllable independently of the other two sets. To this end, the electrode 50 may be replaced by a separate strip electrode for each filter element cell extending along its length with the set of strip electrodes associated with filter elements cells of a respective one colour being interconnected at an edge of the substrate 24, and separately energisable by the control circuit 55.

Such an arrangement enables power saving in a transmissive display device while still operating in a colour mode when used in conjunction with a variable power backlight. To explain this, consideration will be given to a known method of operating a monochrome (black and white) display device. To display an image on a monochrome display device the image data can be analysed to identify the brightest display pixel in the array. This display pixel is then driven so as to be fully transmissive and its required grey-scale by reducing the backlight power to the appropriate level. Other display pixel brightnesses are then achieved by using the display pixels as attenuators. For comparatively dark images the power saving which is obtainable using this technique can be significant. A similar approach can be used in a colour display device such as that of FIGS. 1 and 2 where the three sets of different colour filter elements are independently controlled. In this case, the filter elements are operated in a continuously variable fashion between a substantially non-colouring, transparent, state and a full colouring state rather than merely being switchable between on and off states as previously. In operation, the image to be displayed is analysed to identify the three displays elements which are to be the most transmissive for each separate colour, red, green and blue. The backlight and colour filter element transmissions are then set together so as to achieve the desired coloured image at the lowest possible backlight power level.

Although in the above-described embodiments switchable colour filter elements comprising guest-host materials are used, it is envisaged that the other electro-optic materials capable of being switched at least between a light colouring state and a substantially non-colouring, transparent, state could be used instead. For example, certain kinds of electro-optic (LC) colour filtering arrangements which may be capable of adaptation for use in the above-described manner are described in U.S. Pat. No. 4,003,081. Examples of liquid crystal materials containing ploechroic dyes which are switchable between a state providing colour filtering to produce a colour output and a non-filtering state and which may also be suitable for use in the switchable colour filter elements are described in EP-A-0108472.

The display device need not be an active matrix display device using TFTs (or other switching elements) but could be a simple passive matrix type liquid crystal display device.

Further, the colour filter elements 40 need not extend in the column direction but could instead extend in the row direction with each filter element 40 overlying a respective row of display pixels.

In summary, a colour liquid crystal display device has an array of display pixels for modulating input light and an array of associated colour filter elements which comprise electro-optic filtering elements switchable electrically between a colour filtering state in which a required colour output is produced and a state in which they are substantially transparent to the input light. Such switching can be used beneficially, for example to reduce power consumption by sacrificing full colour output and allowing the brightness level of a back light to be decreased in view of the increased optical efficiency of the pixels when the filter elements are in their transparent state, or to improve viewability in the case of a reflective display used in poor ambient lighting.

From reading the present disclosure, other modifications will be apparent to persons skilled in the art. Such modifications may involve other features which are already known in the field of liquid crystal display devices and component parts therefor and which may be used instead of or in addition to features already described herein.

The invention claimed is:

1. A colour liquid crystal display device comprising
an array of display pixels each of which is driveable to modulate a light input and has associated therewith a respective colour filter element for colouring the modulated light, wherein
the colour filter elements comprise electro-optic elements that are electrically switchable at least between a state providing colour filtering and a state in which they are substantially transparent to the input light.

2. The device of claim 1, wherein:
the device includes a light source providing the light input to the display pixels whose light output level can be adjusted, and
the light source is controlled so as to produce a lower light output level upon the colour filter elements being switched to their substantially transparent state.

3. The device of claim 1, wherein
the colour filter elements are switchable collectively.

4. The device of claim 1, wherein
the colour filter elements of one colour are switchable independently of the colour filter elements of a different colour.

5. The device of claim 1, wherein
the colour filter elements are switchable to an intermediate state in which slight colouring of the modulated light is obtained.

6. The device of claim 1, wherein
the colour filter elements comprise electro-optic colour filtering material disposed between facing electrodes to which switching voltages are applied,
the electrodes being connected to a control circuit operable selectively to control the voltage applied to the electrodes.

7. The device of claim 6, wherein
the electro-optic colour filtering material includes a guest-host liquid crystal material containing dye.

8. The device of claim 7, wherein:
the display pixels are arranged in rows and columns, and
the colour filter elements are provided as colour filter strips,
each strip being of one colour and associated with a respective row or column of display pixels, and
the strips being arranged in repeating groups of different colours.

9. The device of claim 8, wherein:
the display pixels are defined by opposing electrodes carried on the facing surfaces of two, spaced, substrates between which liquid crystal material is disposed, and
the colour filter elements are carried on the outside surface of one of the substrates.

10. The device of claim 8, wherein:
the display pixels are defined by opposing electrodes carried on the facing surfaces of two, spaced, substrates between which liquid crystal material is disposed, and
the colour filter elements are carried on the inner surface of one of the substrates.

11. The device of claim 10, wherein
the guest-host material comprises droplets dispersed in a polymer matrix.

12. The device of claim 2, wherein
the colour filter elements are switchable collectively.

13. The device of claim 2, wherein
the colour filter elements of one colour are switchable independently of the colour filter elements of a different colour.

14. The device of claim 2, wherein
the colour filter elements are switchable to an intermediate state in which slight colouring of the modulated light is obtained.

15. The device of claim 4, wherein
the colour filter elements are switchable to an intermediate state in which slight colouring of the modulated light is obtained.

16. The device of claim 13, wherein
the colour filter elements are switchable to an intermediate state in which slight colouring of the modulated light is obtained.

17. The device of claim 2, wherein:
the colour filter elements comprise electro-optic colour filtering material disposed between facing electrodes to which switching voltages are applied, and
the electrodes being connected to a control circuit operable selectively to control the voltage applied to the electrodes.

18. The device of claim 3, wherein:
the colour filter elements comprise electro-optic colour filtering material disposed between facing electrodes to which switching voltages are applied, and
the electrodes being connected to a control circuit operable selectively to control the voltage applied to the electrodes.

19. The device of claim 4, wherein:
the colour filter elements comprise electro-optic colour filtering material disposed between facing electrodes to which switching voltages are applied, and
the electrodes being connected to a control circuit operable selectively to control the voltage applied to the electrodes.

20. The device of claim 5, wherein:
the colour filter elements comprise electro-optic colour filtering material disposed between facing electrodes to which switching voltages are applied, and
the electrodes being connected to a control circuit operable selectively to control the voltage applied to the electrodes.

* * * * *